(12) United States Patent
Casimiro et al.

(10) Patent No.: US 11,990,008 B2
(45) Date of Patent: May 21, 2024

(54) DISSUASION CASSETTE, SYSTEM, AND APPARATUS AGAINST CURRENCY THEFT FROM MEDIA DEPOSITORY

(71) Applicant: NCR Corporation, Atlanta, GA (US)

(72) Inventors: Luciano Rodrigo Casimiro, Lauzane Paulista (BR); Wilson Kume, Manaus (BR)

(73) Assignee: NCR Corporation, Atlanta, GA (US)

( * ) Notice: Subject to any disclaimer, the term of this patent is extended or adjusted under 35 U.S.C. 154(b) by 80 days.

(21) Appl. No.: 17/123,516

(22) Filed: Dec. 16, 2020

(65) Prior Publication Data
US 2022/0189258 A1   Jun. 16, 2022

(51) Int. Cl.
| | | |
|---|---|---|
| *G07F 19/00* | (2006.01) | |
| *E05G 1/14* | (2006.01) | |
| *G06Q 20/18* | (2012.01) | |
| *G07D 11/125* | (2019.01) | |
| *G07D 11/14* | (2019.01) | |

(52) U.S. Cl.
CPC ............. *G07F 19/205* (2013.01); *E05G 1/14* (2013.01); *G07D 11/125* (2019.01); *G06Q 20/18* (2013.01); *G07D 11/14* (2019.01); *G07D 2211/00* (2013.01)

(58) Field of Classification Search
CPC ... G07F 19/205; G07F 19/209; G07D 11/125; G07D 11/225; G07D 11/14; G07D 2211/00; E05G 1/12; E05G 1/14; G06Q 20/18
See application file for complete search history.

(56) References Cited

U.S. PATENT DOCUMENTS

| | | | | |
|---|---|---|---|---|
| 5,156,272 | A * | 10/1992 | Bouchard | E05G 1/14 |
| | | | | 206/459.1 |
| 5,537,938 | A * | 7/1996 | Lopez, Jr. | E05G 1/14 |
| | | | | 109/34 |
| 5,598,793 | A * | 2/1997 | Lopez, Jr. | E05G 1/14 |
| | | | | 109/25 |
| 5,617,799 | A * | 4/1997 | Kaczorowski | G08B 15/02 |
| | | | | 109/20 |
| 6,564,726 | B1 * | 5/2003 | Lindskog | E05G 1/14 |
| | | | | 109/25 |
| 6,712,011 | B2 * | 3/2004 | Fumanelli | E05G 1/005 |
| | | | | 109/20 |

(Continued)

OTHER PUBLICATIONS

Zarantonello, Adrien, "Oberthur IBNS Solution for Cash Protection in ATMs", (2020), 9 pgs.

*Primary Examiner* — Daniel I Walsh
(74) *Attorney, Agent, or Firm* — Schwegman Lundberg & Woessner, P.A.

(57) ABSTRACT

A valuable media cassette comprises a cover and a valuable media storage base. The cover comprises two ink bags filled with indelible ink. Each ink bag situated on opposing sides of an inside portion of the cover and encased by a blast energy collection plate such that portions of the bag extends partially through serrated teeth of the blast energy collection plate. The blast energy collection plates harness energy associated with a blast force causing the serrated teeth to displace and puncture the ink bags when a blast occurs. The indelible ink is dispersed throughout an inside of the cassette coating the valuable media stored in the cassette with the indelible ink and rendering the valuable media unusable or damaged.

16 Claims, 9 Drawing Sheets

(56) References Cited

U.S. PATENT DOCUMENTS

| | | | | |
|---|---|---|---|---|
| 7,201,312 B2* | 4/2007 | Fumanelli | | A45C 13/24 |
| | | | | 902/8 |
| 10,808,450 B2* | 10/2020 | Westington | | E05G 1/12 |
| 10,837,218 B2* | 11/2020 | Robson | | E05G 1/14 |
| 2002/0074394 A1* | 6/2002 | Birnie | | G07F 19/205 |
| | | | | 235/379 |
| 2002/0170955 A1* | 11/2002 | Hagglund | | G07D 11/13 |
| | | | | 235/379 |
| 2003/0033965 A1* | 2/2003 | Van Lint | | E05G 1/14 |
| | | | | 109/29 |
| 2004/0007165 A1* | 1/2004 | Abe | | E05G 1/14 |
| | | | | 109/20 |
| 2004/0144569 A1* | 7/2004 | Pritchard | | E05G 1/14 |
| | | | | 175/99 |
| 2005/0000396 A1* | 1/2005 | Dyson | | E05G 1/14 |
| | | | | 109/25 |
| 2005/0010525 A1* | 1/2005 | Ross | | G06Q 20/1085 |
| | | | | 705/43 |
| 2005/0051448 A1* | 3/2005 | Miles | | G07D 11/125 |
| | | | | 206/459.1 |
| 2005/0121508 A1* | 6/2005 | Fumanelli | | E05G 1/14 |
| | | | | 235/379 |
| 2008/0257232 A1* | 10/2008 | Lindskog | | E05G 1/14 |
| | | | | 109/23 |
| 2010/0193582 A1* | 8/2010 | Johnson | | G07D 11/125 |
| | | | | 232/1 D |
| 2012/0005297 A1* | 1/2012 | Robles Gil Daellenbach | | |
| | | | | G07F 9/002 |
| | | | | 709/208 |
| 2013/0336086 A1* | 12/2013 | Carreon | | G07D 7/202 |
| | | | | 367/7 |
| 2014/0069770 A1* | 3/2014 | Nomura | | E05G 1/14 |
| | | | | 194/206 |
| 2014/0072696 A1* | 3/2014 | Nomura | | G07D 11/125 |
| | | | | 427/7 |
| 2014/0239007 A1* | 8/2014 | McBride | | G07F 19/203 |
| | | | | 221/1 |
| 2014/0368343 A1* | 12/2014 | Dobbins | | G08B 13/126 |
| | | | | 340/541 |
| 2015/0191960 A1* | 7/2015 | Robson | | E05G 1/02 |
| | | | | 109/25 |
| 2016/0371911 A1* | 12/2016 | Jones | | G07D 11/237 |
| 2016/0376828 A1* | 12/2016 | Grant | | E05G 1/14 |
| | | | | 109/29 |
| 2017/0004466 A1* | 1/2017 | Robles Gil Daellenbach | | |
| | | | | G06Q 20/1085 |
| 2017/0228957 A1* | 8/2017 | Yokote | | E05G 1/12 |
| 2017/0292316 A1* | 10/2017 | Chang | | G07F 19/201 |
| 2018/0108222 A1* | 4/2018 | Lopez | | G07D 11/225 |
| 2018/0148241 A1* | 5/2018 | Gulas | | B32B 27/36 |
| 2018/0151019 A1* | 5/2018 | Kashiwabuchi | | G07D 11/13 |
| 2019/0130715 A1* | 5/2019 | Chang | | G08B 15/02 |
| 2019/0329558 A1* | 10/2019 | Yamaguchi | | B41J 2/17546 |
| 2020/0206793 A1* | 7/2020 | Brady | | B09C 1/06 |
| 2021/0002944 A1* | 1/2021 | Fumanelli | | G07F 19/205 |
| 2022/0169863 A1* | 6/2022 | Kremenak | | C09C 3/066 |
| 2022/0189258 A1* | 6/2022 | Casimiro | | G07F 19/205 |
| 2022/0333430 A1* | 10/2022 | Fumanelli | | G07D 11/125 |

* cited by examiner

DISSUASION CASSETTE, SYSTEM, AND APPARATUS AGAINST CURRENCY THEFT FROM MEDIA DEPOSITORY

BACKGROUND

Media handing devices process media documents and bunches of media documents after separating the media documents for individual processing downstream within the media handling devices. Media handing devices include a variety of integrated components.

One type of media handling device is an Automated Teller Machine (ATM), which stores currency notes within media cassettes of the AMT's depository (a component of the ATM). The cassettes are located within a safe or secure housing of the depository to prevent theft of the currency notes (cash).

Many thieves have stopped trying to compromise the software of the ATM in attempts to cause the ATM to voluntarily dispense cash because ATM security software has improved over the years and such efforts are more difficult to achieve.

As a result, thieves have become more brazen and many have resorted to stealing ATMs by attaching chains to the ATMs and using their vehicles to rip the ATMs from their floor mounts and drag the ATMs to remote locations. Once at the remote locations, the thieves try to blast open the safes or they use other destructive techniques in order to access the cassettes and obtain the cash.

In fact, some thieves may not even attempt to move the ATMs before blasting the ATMs or using other tools to pry open the safes. Typically, in these cases, the ATMs are not being physically monitored by other people (even through they still may be monitored remotely by video feeds). Some of these ATMs are located outside businesses or in locations that permit drive up access.

With sufficient blasting force or sufficient time using destructive tools, the thieves are usually successful in accessing the cassettes and the cash. This results in substantial losses to the financial institutions, since ATMs house a significant amount of cash and the financial institutions proactively replenish ATMs that are low on cash ensuring that nearly any thieve-selected ATM will provide a lucrative amount of cash. Surveillance systems and/or witnesses may ensure that ATM thieves are ultimately caught to face justice, but the stolen cash is usually gone by that time and irretrievable by the authorities.

SUMMARY

In various embodiments, methods, a valuable media cassette, and system for dissuasion against currency theft from a valuable media depository are provided.

According to an aspect, a valuable media cassette is presented. The valuable cassette comprises a storage base to store valuable media and a cover. The cover comprises a first inside portion comprising a first blast energy collection plate with a first aperture surrounded by a first set of teeth, and a second inside portion comprising a second blast energy collection plate with a second aperture surrounded by a second set of teeth. The first blast energy collection plate is adapted to encase and to hold a first fluid filled bag with first bag portions extending through the first set of teeth. The second blast energy collection plate is adapted to encase and to hold a second fluid filled bag with second bag portions extending through the second set of teeth. The first set of teeth is adapted to puncture the first bag portions and the second set of teeth is adapted to puncture the second bag portions when the cover is in a closed position and after encountering a sufficient force to cause the first fluid filled bag and the second fluid filled bag to rupture and disperse a fluid onto the valuable media.

DETAILED DESCRIPTION

Figure 1:
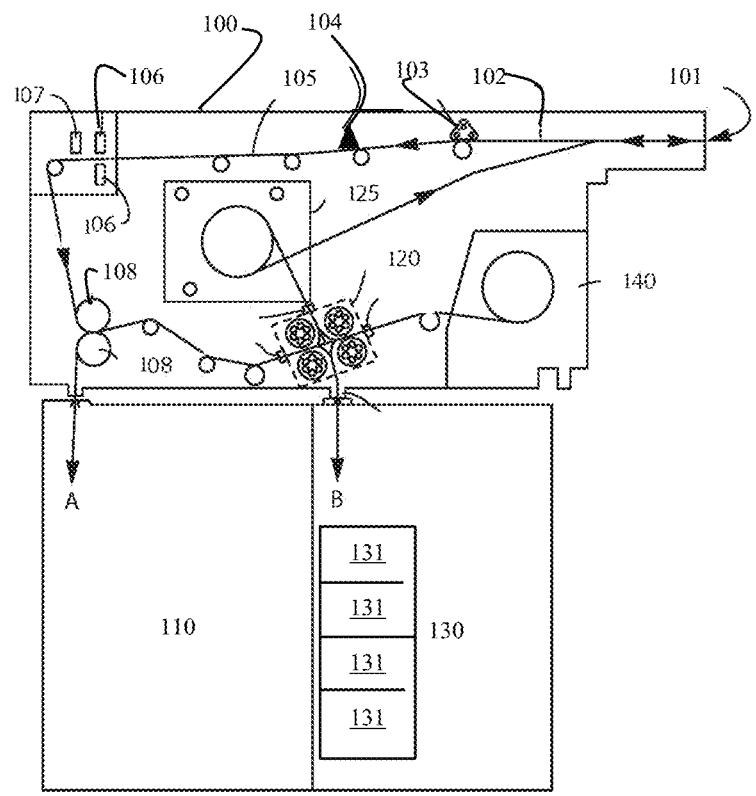
FIG. 1 is a diagram depicting a deposit module of a Self-Service Terminal (SST) having a dissuasion system, according to an example embodiment.

FIG. 1 is a diagram depicting a deposit module 100 of a Self-Service Terminal (SST) having a media validation device (module), according to an example embodiment. It is to be noted that the deposit module 100 is shown with only those components relevant to understanding what has been added and modified to a conventional deposit module for purposes of providing dissuasion against currency theft of the valuable media handled by deposit module 100. Deposit module 100 may also be referred to as depository 100 or system 100 herein and below.

As will be described more completely herein and below, depository/system 100 provides a passive (non-electrical) mechanism by which valuable media residing within valuable media cassettes (discussed below with FIGS. 1-7) of system 100 can self-rupture indelible ink bags and disperse that ink over the valuable media, causing the valuable media to be damaged and be incapable of using due to permanent ink stains. Any destructive force applied to depository/system 100 and/or the valuable media cassette 131 results in rupturing of the ink bags. This passive dissuasion against currency theft cost-effectively provides added security to SSTs (such as ATMs, Point-Of-Sale (POS) terminals, and kiosks), which house valuable media.

The depository 100 is suitable for use within an Automated Teller Machine (ATM), which can be utilized to process deposited banknotes and checks (valuable media as a mixed bunch if desired). The deposit module 100 has an access mouth 101 (media or document infeed) through which incoming checks and/or banknotes are deposited or outgoing checks and/or banknotes are dispensed. This mouth 101 is aligned with an infeed aperture in the fascia of the ATM in which the depository 100 is located, which thus provides an input/output slot to the customer. A bunch (stack) of one or more items (valuable media) is input or output. Incoming checks and/or banknotes follow a first transport path 102 away from the mouth 101 in a substantially horizontal direction from right to left shown in the FIG. 1. They then pass through a separator module 103 and from the separator 103 to a deskew module 104 along another pathway portion 105, which is also substantially horizontal and right to left. The items are now de-skewed and aligned for reading by imaging cameras 106 and a Magnetic Ink Character Recognition (MICR) reader 107 by a media validation module (comprising the cameras 106 and MICR reader 107).

Items are then directed substantially vertically downwards to a point between two nip rollers 108. These nip rollers cooperate and are rotated in opposite directions with respect to each other to either draw deposited checks and/or banknotes inwards (and urge those checks and/or banknotes towards the right hand side in the FIG. 1), or during another mode of operation, the rollers can be rotated in an opposite fashion to direct processed checks and/or banknotes downwards in the direction shown by arrow A in the FIG. 1 into a check or banknote bin 110. Incoming checks and/or banknotes, which are moved by the nip rollers 108 towards the right, enter a diverter mechanism 120. The diverter mechanism 120 can either divert the incoming checks and/or banknotes upwards (in the FIG. 1) into a re-buncher unit 125, or downwards in the direction of arrow B in the FIG. 1 into a cash bin 130 where the cash is stored in novel media cassette 131, or to the right hand side shown in the FIG. 1 into an escrow 140. Items of media from the escrow 140 can selectively be removed from the drum and re-processed after temporary storage. This results in items of media moving from the escrow 140 towards the left-hand side of the FIG. 1 where again they will enter the diverter mechanism 120. The diverter mechanism 120 can be utilized to allow the transported checks (a type of valuable media/document) and/or banknotes (another type of valuable media/document) to move substantially unimpeded towards the left-hand side and thus the nip rollers 108 or upwards towards the re-buncher 125. Currency notes from the escrow can be directed to the re-buncher 125 or downwards into the banknote bin 130 where they are stored in novel cassette 131 (see FIGS. 2-7 below).

As used herein, the phrase "valuable media" refers to media of value, such as currency, coupons, checks, negotiable instruments, value tickets, and the like.

For purposes of the discussions that follow with respect to the FIGS. 1-7, "valuable media" is referred to as currency (currency note, currency, or cash) and the "valuable media depository" is referred to as a "depository 100" or "system 100." Furthermore, the terms "note," "media item," "banknote," "cash," "currency note," and "document" may be used interchangeably and synonymously herein.

Additionally, the terms and phrases "valuable media cassette," "media cassette," and "cassette" may be used synonymously and interchangeably herein.

Figure 2:
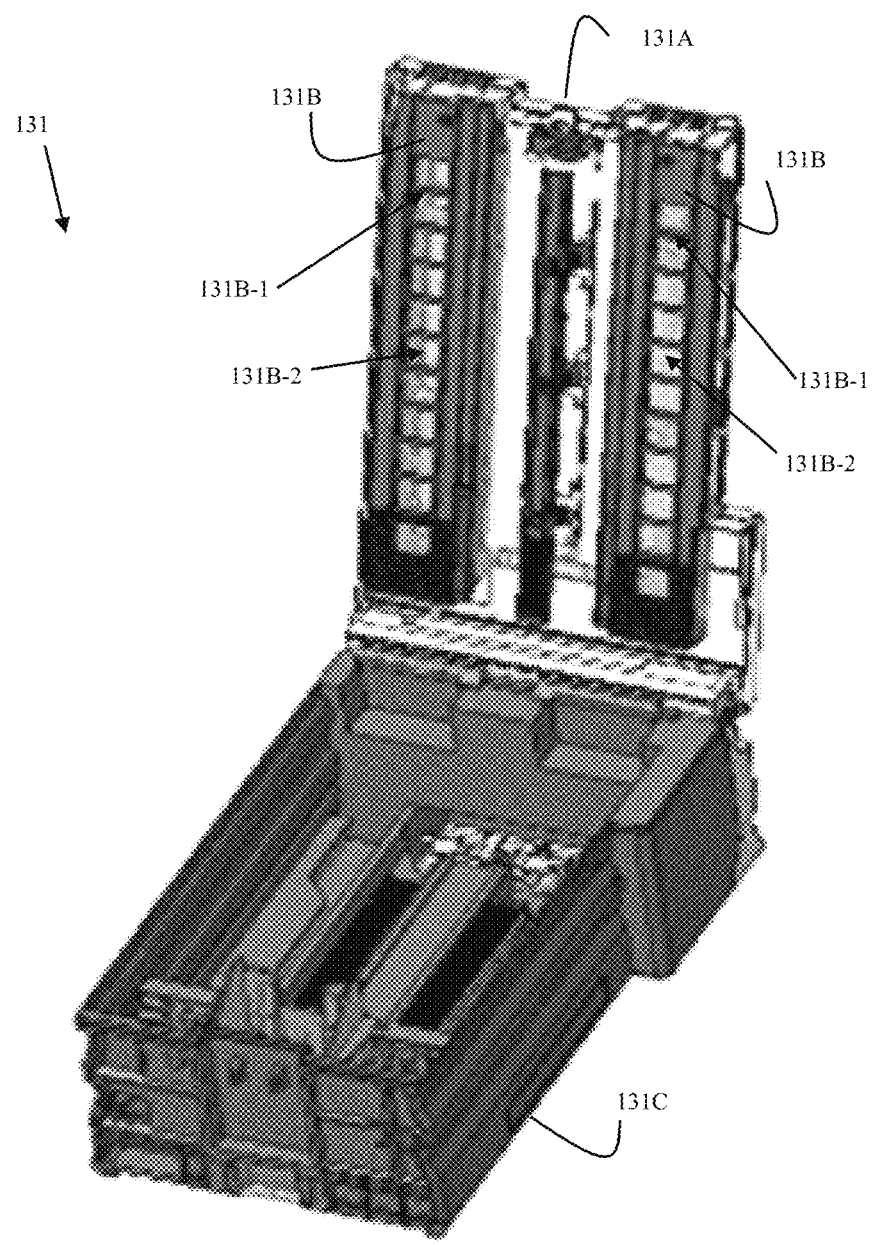
FIG. 2 is a diagram depicting a dissuasion system and cassette, according to an example embodiment.

FIG. 2 is a diagram depicting a dissuasion system and cassette 131, according to an example embodiment. That is, cassette 131 may also be referred to as a dissuasion system 131.

Cassette 131 comprises a novel cassette cover 131A, two plastic guide covers 131B, and a cash storage base 131C. Each plastic guide cover 131 comprises a plurality of bars 131B-1, with pairs of two bars defining a dispersion window, a hole, or an aperture. Situated behind the dispersion windows and the plastic guide cover is a vacuum-packed plastic bag 131B-2 filled with indelible ink (herein after "ink bag 131B-2).

In an embodiment, the indelible ink is made of polypropylene.

Figure 3:
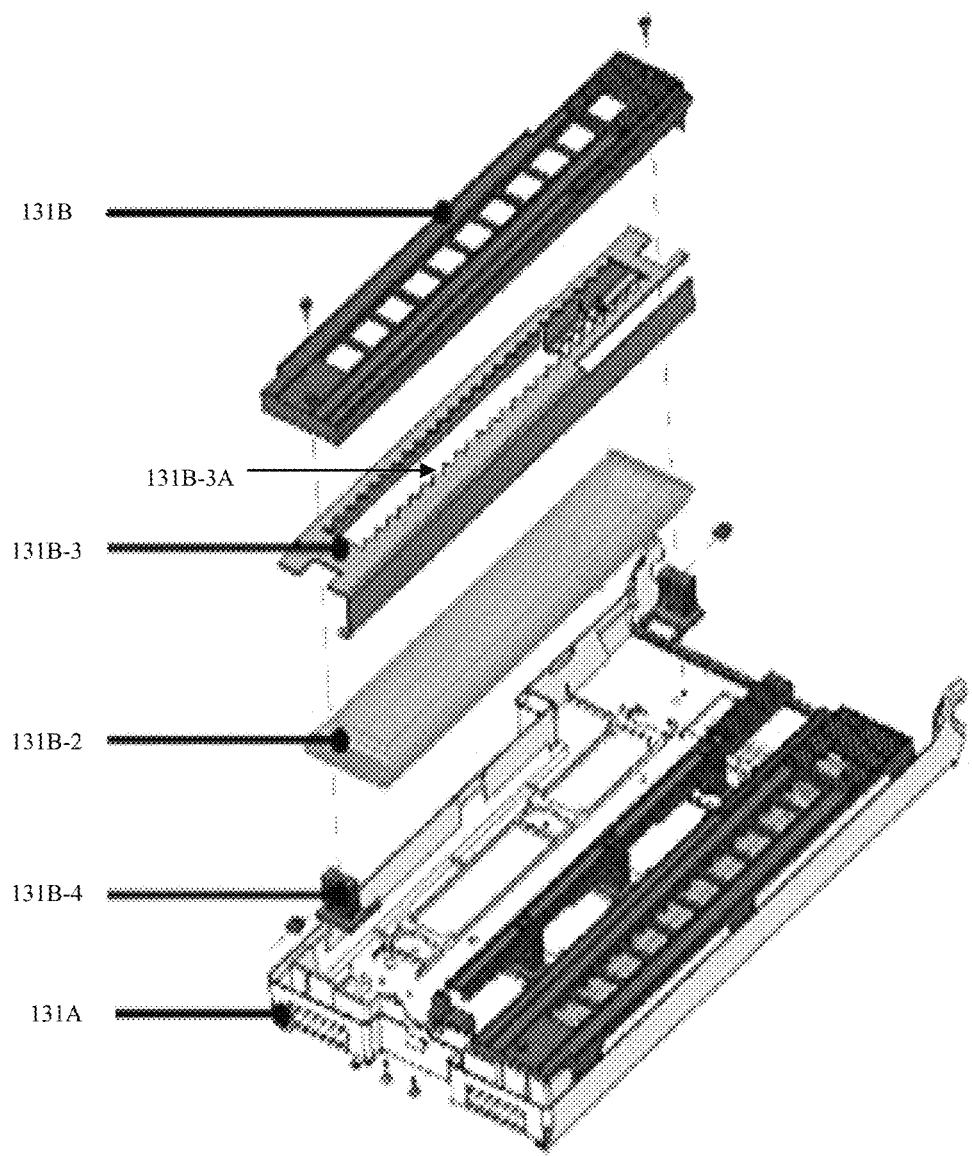
FIG. 3 is a diagram depicting an apparatus of the dissuasion system and cassette of FIG. 2, according to an example embodiment.

FIG. 3 is a diagram depicting an apparatus of the dissuasion system and cassette 131 of FIG. 1, according to an example embodiment.

Situated directly behind each plastic guide 131B is a blast energy collection plate 131B-3. A top portion of blast energy collection plate 131B-3 comprises serrated edges or serrated metal teeth 131B-3A surrounding a perimeter of an aperture. Ink bag 131B-2 is situated under blast energy collection plate 131B-3 such that a top portion of ink bag 131B-2 protrudes through the aperture of blast energy collection plate 131B-3 and is engaged or is touched by serrated teeth 131B-3A. Ink bag 131B-2 rests on a surface of cover 131A and is held firmly in place to avoid movement of ink bag 131B-2 by two adjustable spaces 131B-4. Spacers 131B-4 are moveable/adjustable, such that each spacer 131B-4 engages a unique end of ink bag 131B-2 to hold ink bag 131B-2 firmly in place on the surface of cover 131B.

Blast energy collection plate 131B-3 harnesses blast energy experienced during a blast, which causes serrated teeth 131B-3A to displace and rupture ink bag 131B-2 when the harnessed energy from the blast is released from blast energy collection plate 131B-3. The blast energy collection plate 131B-3 also functions or is adapted to be a liner and hold in bag 131B-2 within cover 131A. Blast energy collection plate 131B-3 absorbs the blast energy and contracts and then releases the absorbed energy by expanding, this expansion thrusts serrated teeth 131B-3A into bag 131B-2 (rupturing bag 131B-2). This is achieved without any form of a power source required to activate blast energy collection plate 131B-3 other than the blast force itself. Conventional approaches require some power source to activate a dissuasion mechanism, such is not required with the present system 100.

Figure 4:
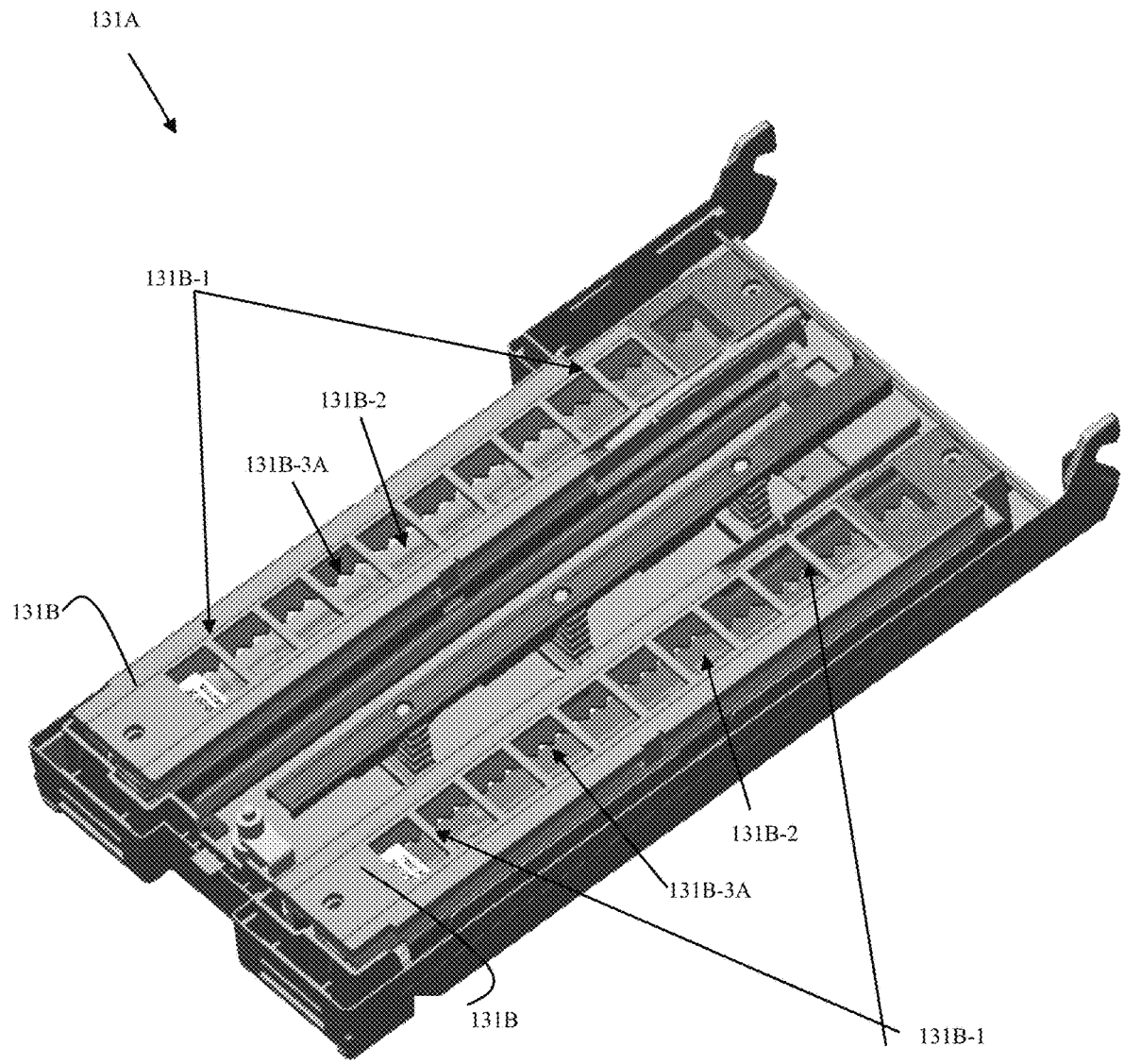
FIG. 4 is a diagram depicting a front view of the dissuasion system and cassette of FIG. 2, according to an example embodiment.

FIG. 4 is a diagram depicting a front view of the dissuasion system and cassette 131 of FIG. 2, according to an example embodiment.

Plastic covers 131B-1 are illustrated with ink bags 131B-2 visible through dispersion windows defined by spaced bars 131B-1. In FIG. 4, the components illustrated in FIG. 3 are assembled with ink bags 131B-2 loaded into cover 131A for deployment into cash bin 130 of depository 100.

In FIG. 4, cover 131A is in an open position, such that before cassette 131 is loaded into cash bin 130 of depository 100, cash is loaded into cash storage base 131C and the cover 131A is moved to a closed position to seal cassette 131 shut. In the closed position, the ink bags 131B-2 are situated directly above cash loaded into the cassette 131. This ensures that should the cassette 131 experience a force through a blasting, pounding, and/or dragging of depository 100, cash bin 130, and/or cassette 131, serrated teeth 131B-3A of blast energy collection plate 131B-3 rupture a top portion of ink bag 131B-2 causing the indelible ink of ink bag 131B-2 to disperse over the cash housed in cash storage base 131C.

Figure 5:
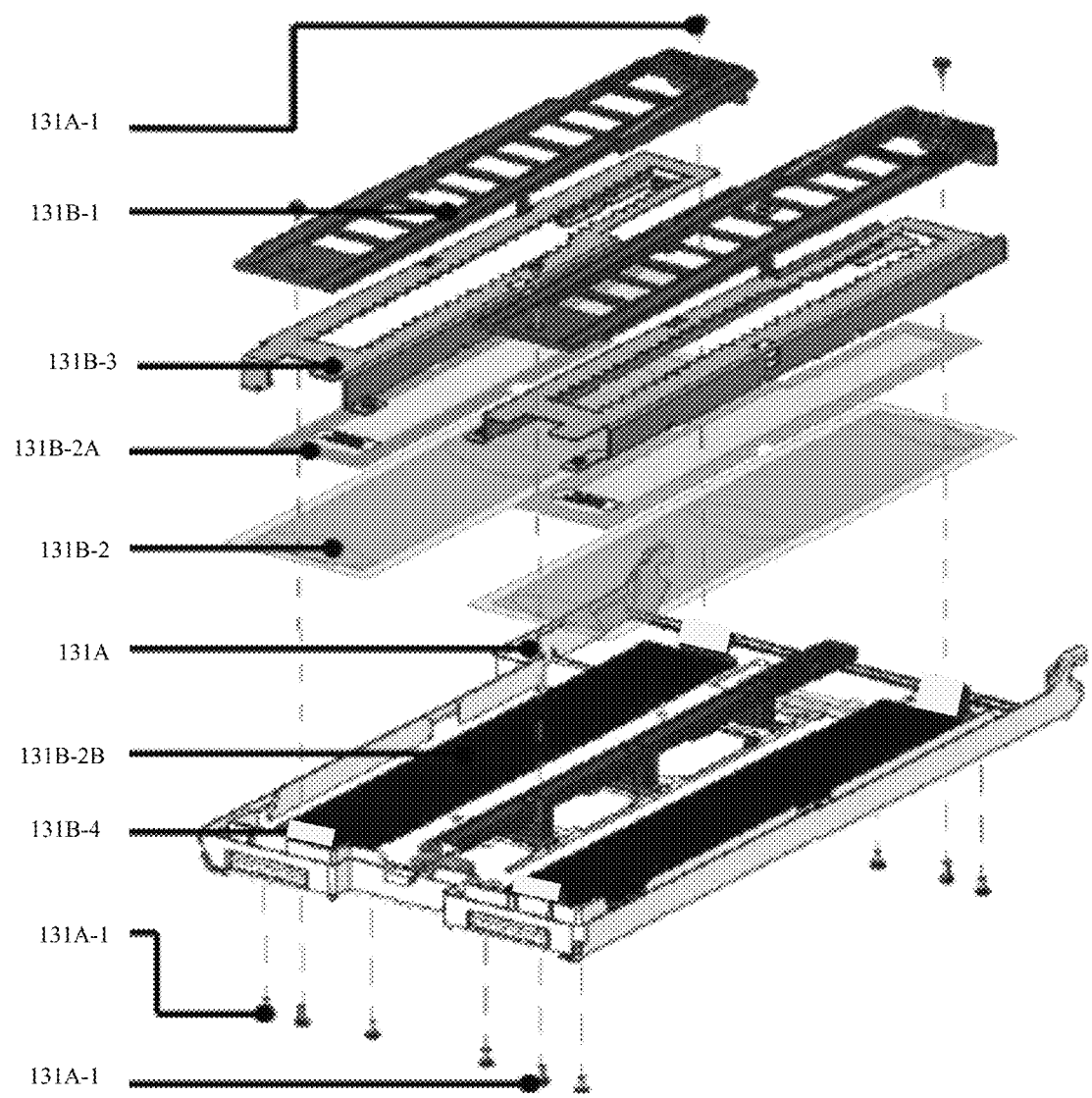
FIG. 5 is a diagram depicting another apparatus of the dissuasion system and cassette of FIG. 1, according to an example embodiment.

FIG. 5 is a diagram depicting another apparatus of the dissuasion system and cassette 131 of FIG. 1, according to an example embodiment.

FIG. 5 illustrates an enhanced apparatus from that which was depicted in FIG. 3 above.

More particularly, screws 131A-1 are shown to fasten components of the apparatus to cover 131A. Additionally, an upper protection bag 131B-2A with an ink validation/expiration label is situated immediately between blast energy collection plate 131B-3 and indelible ink bag 131B-2. Further, indelible ink bag 131B-2 rests on top of a bottom ink protection label 131B-4.

FIG. 5 similar to FIG. 3 illustrate two independent apparatuses within an inside portion of cover 131A while cover 131A is in an open position, permitting access to each apparatus for purposes of inserting upper label protection bag 131B-2A, indelible ink bag 131-2, and bottom or lower label protection bag 131B-2B. Screws 131A-1 are removed, and bag 131B-2 is rested on top of lower label protection bag 131B-2B. Spacers 131B-4 are adjusted to snuggly hold and pinch ends of bag 131B-2 so that bag 131B-2 is held in place and slack in bag 131B-2 removed to force ink in bag 131B-2 upward. Upper protection label 131B-2A is placed over a top surface of bag 131B-2 and blast energy collection plate 131B-3 placed down over upper protection label 131B-2A. Guide 131B-1 is placed over blast energy collection plate 131B-3 and aligned with holes in blast energy collection plate 131B-3 and screws 131A-1 inserted to fasten each apparatus firmly to the inside portion of cover 131A.

Figure 6:
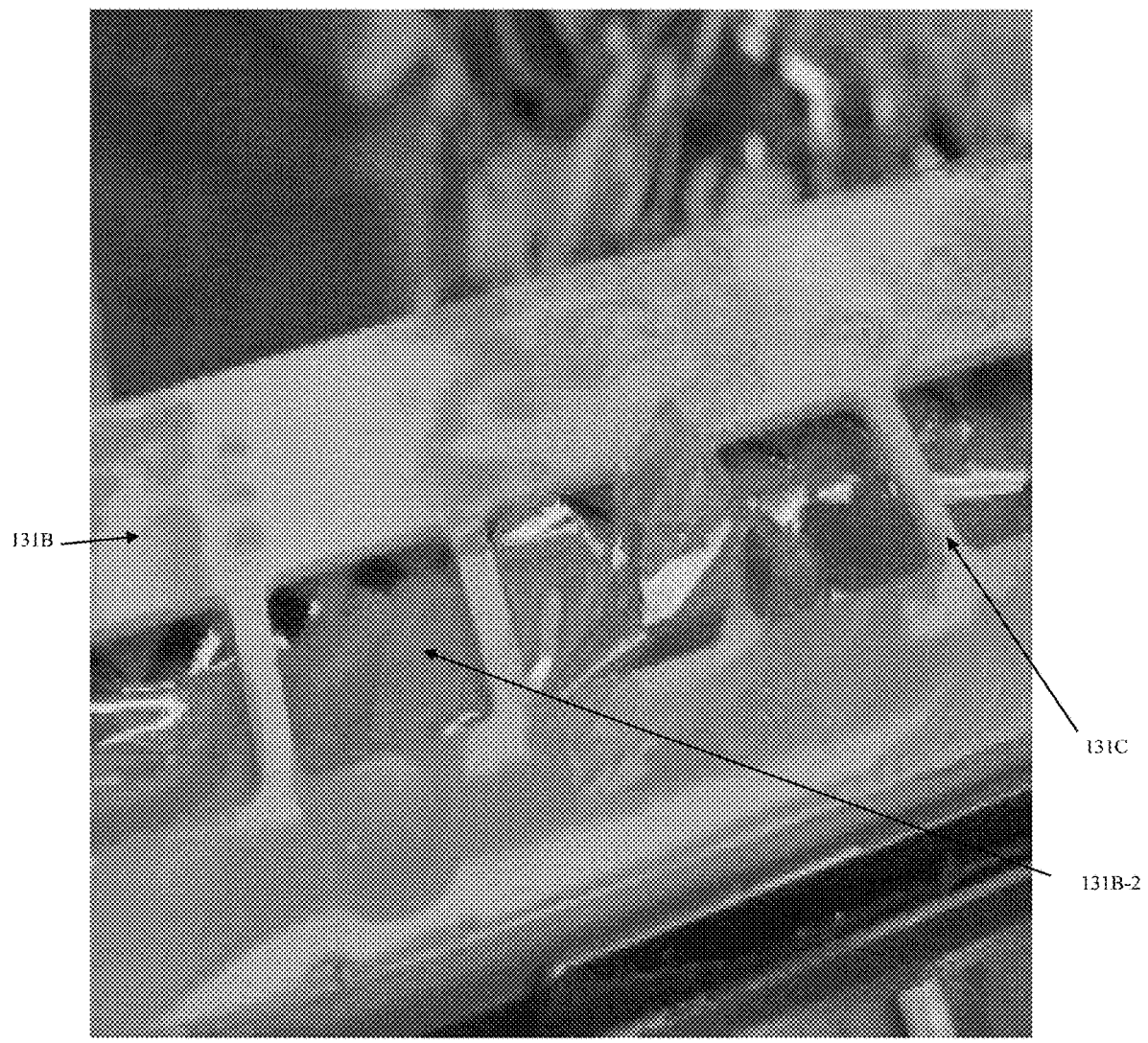
FIG. 6 is a diagram depicting dispensed ink after the dissuasion system and cassette of FIG. 2 encounters force in an unauthorized attempt to access cash located with the cassette, according to an example embodiment.

FIG. 6 is a diagram depicting dispensed ink after the dissuasion system and cassette 131 of FIG. 2 encounters force in an unauthorized attempt to access cash located with the cassette, according to an example embodiment.

FIG. 6 shows a ruptured ink bag 131B-2 after a force caused serrated teeth 131B-3A of blast energy collection plate 131B-3 to puncture ink bag 131B-2. Although, FIG. 6 illustrates a ruptured ink bag 131B-2 with the cover 131A opened, it is noticeable that sides of guide 131B are heavily stained in the indelible ink.

It should be noted that since the ink-bags 131B-2 are situated directly above cash when cover 131A is in a closed position, when the ink bags 131B-2 are ruptured, the indelible ink is forced directly onto the cash loaded in cash storage base 131C. Moreover, since cassette 131 is sealed when the cover 131A is in a closed position, the indelible ink is dispersed throughout the inside of cassette 131 ensuring complete coverage of the indelible ink on the loaded cash.

Figure 7:
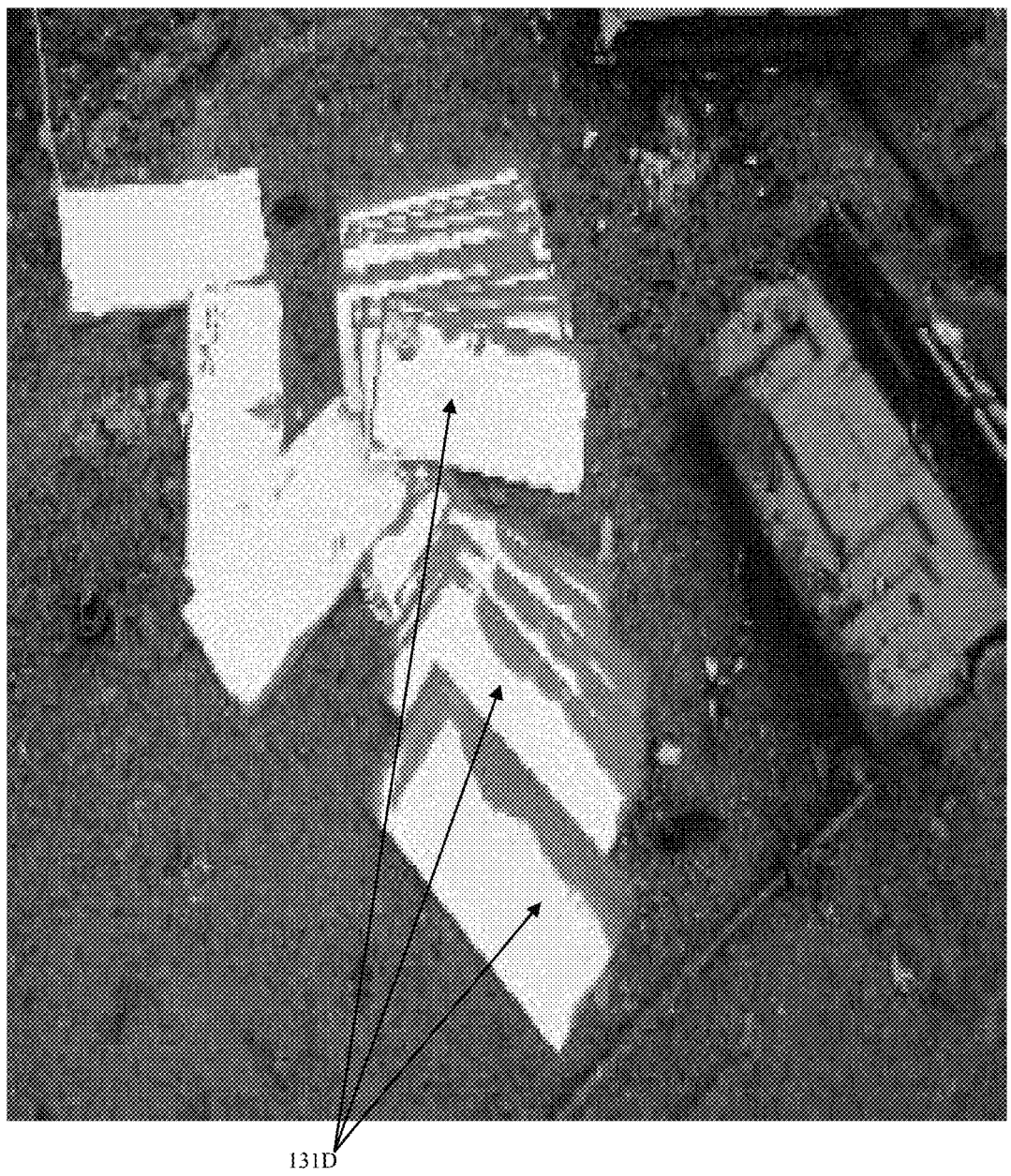
FIG. 7 is a diagram depicting ink stained currency for currency that resided in the dissuasion system and cassette of FIG. 6, according to an example embodiment.

FIG. 7 is a diagram depicting ink stained currency 131D for currency that resided in the dissuasion system and cassette 131 of FIG. 6, according to an example embodiment.

After serrated teeth 131B-3A puncture the ink bags 131B-2 and the indelible ink is dispersed within cassette 131, the original loaded cash becomes unusable ink-stained cash 131D as illustrated in FIG. 7.

Figure 8:
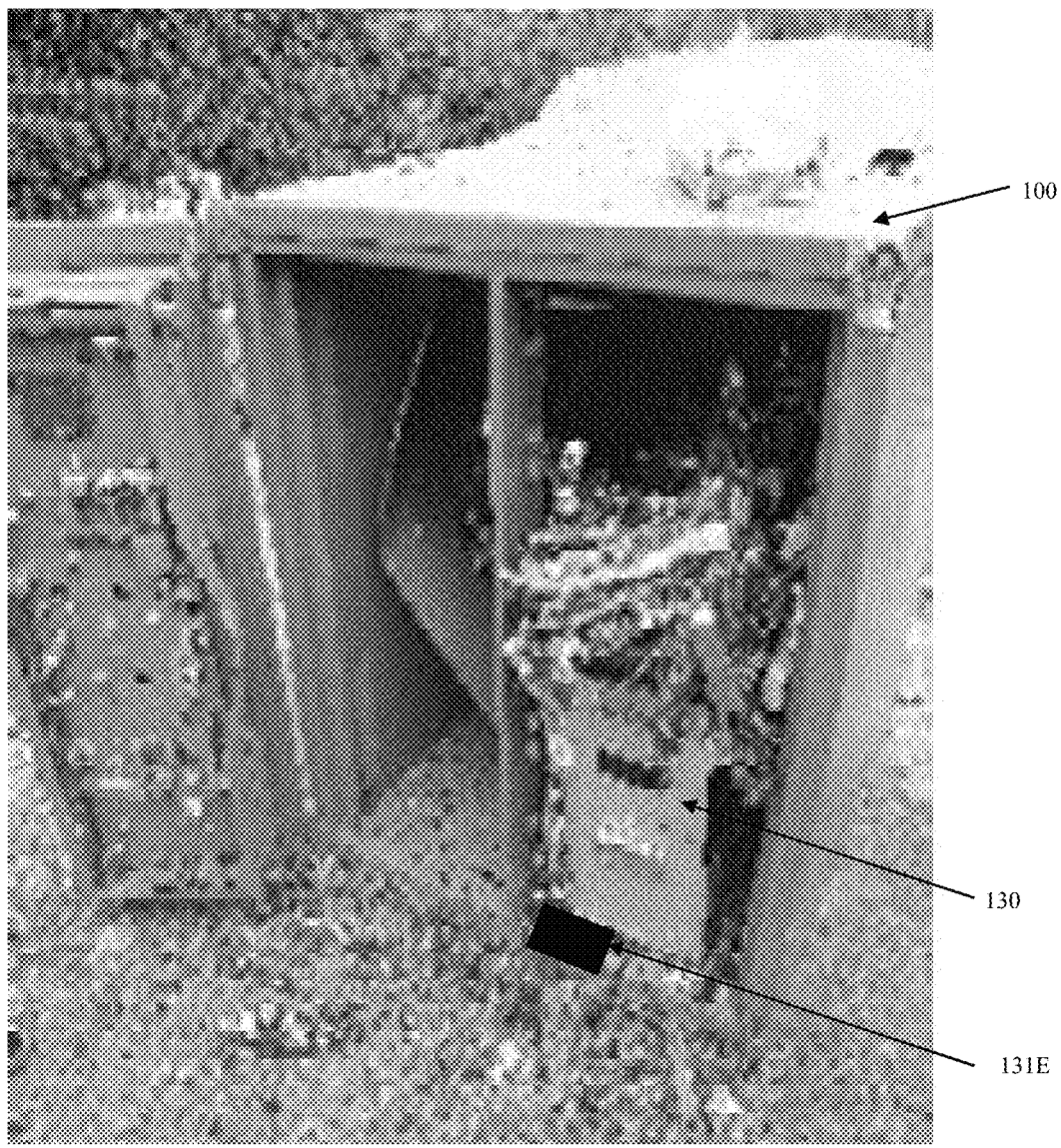
FIG. 8 is a diagram depicting a condition of a depository and cash bin 130 of FIG. 2 following a tested blasting force to demonstrate an unauthorized attempt to access cash located within the cassette, according to an example embodiment.

FIG. 8 is a diagram depicting a condition of depository 100 and cash bin 130 of FIG. 2 following a tested blasting force to demonstrate an unauthorized attempt to access cash located within the cassette 131, according to an example embodiment.

FIG. 8 illustrates a condition of a depository 100 and cash bin 130 after conducting a blasting test in an effort to gain access to cash bin 130 and cassettes 131. As shown, a lot of debris is depicted some of the debris includes metal and plastic fragments of the components of depository 131; however, cash bin 130 was able to remain largely intact with minimal damage. The force of this blast caused serrated teeth 131B-3A to puncture ink bags 131B-2 within cassettes 131 of cash bin 131 and dispersed the indelible ink onto the cash as was shown in FIG. 7 above as unusable ink-stained cash 131D. 131E illustrates a darkened shaded (blackened) area under cash bin 130, this is the indelible ink that has seeped out from cassettes 131 and cash bin 130 following the blast and rupturing of the ink bags 131B-2.

One now appreciates how a novel and passive (non-electrical) dissuasion system and cassette 131 can render loaded cash within a depository 100 to be unusable to any potential thief that attempts to use force to gain access to the cassette 131. Existing cassettes do not require a complete redesign; rather cover 131A can be provided to fit an existing cash storage base. Spacer bars 131B-1 permit different sized ink bags 131B-2 to be used within cover 131A.

In an embodiment, ink bag 131B-2 is manufactured with polypropylene, which is resistant to paint corrosion that may cause ink bag 131B-2 to self-rupture over time. Moreover, the strength of the ink bag 131B-2 is manufactured with sufficient mechanical stiffness to assure that accidental rupture does not occur during transit of cassette 131.

In an embodiment, either the front side of cover 131A (side visible when cassette 131 is in a closed position), the ink bag 131B-2, and/or one of the dispersion windows defined by spaced bars 131B-1 comprise one or more warning labels about how the cassette 131 is to be handled during transit and cash bin loading, about the danger of the indelible ink should a handler be exposed to it, and about an expiration date for the ink bag 131B-2 (after which ink bag 131B-2 should be replaced).

In an embodiment, depository 100 may be a recycling module capable of recycling deposit cash for cash dispense transactions on the SST, which includes depository 100.

In an embodiment, depository 100 is an integrated peripheral device of an ATM, an POS terminal, an SST, or a kiosk.

Figure 9:
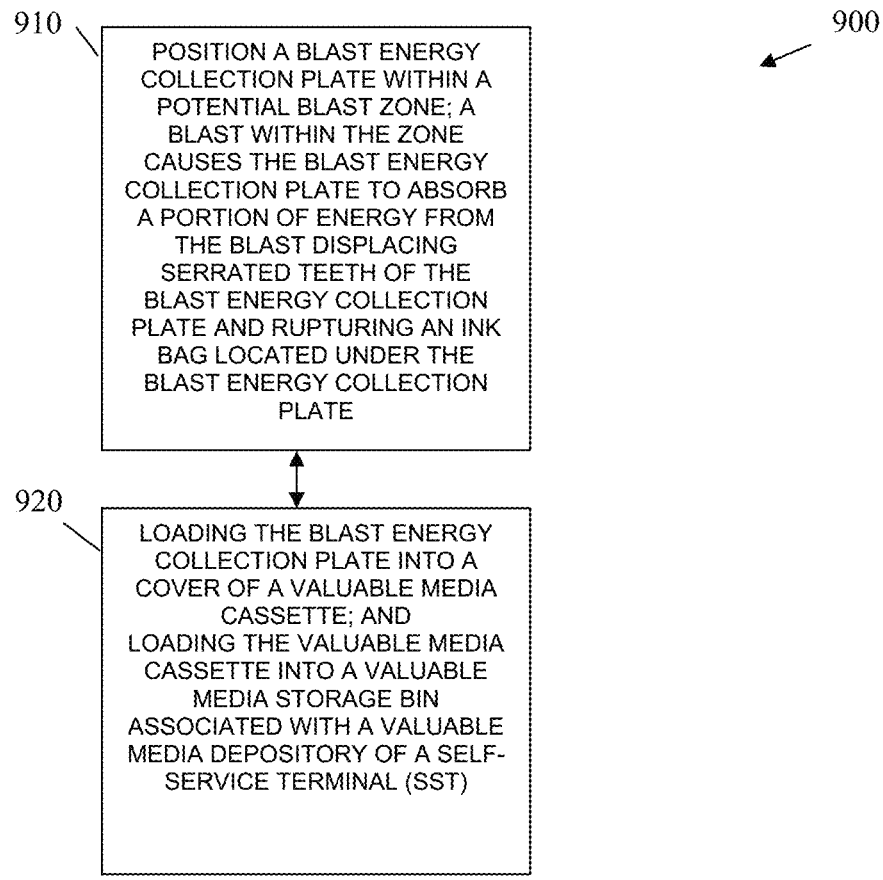
FIG. 9 is a diagram of a method for operating a dissuasion system and cassette of FIG. 2, according to an example embodiment.

FIG. 9 is a diagram of a method for operating a dissuasion system and cassette of FIG. 2, according to an example embodiment.

At 910, a blast energy collection plate 131B-3 is positioned within a potential blast zone. A blast within the zone causes the blast energy collection plate 131B-3 to absorb a portion of energy from the blast displacing serrated teeth 131B-3A of the blast energy collection plate 131B-3 and rupturing an ink bag 131B-2 located under the blast energy collection plate 131B-3.

In an embodiment, at 920, the blast energy collection plate 131B-3 is loaded into a cover 131A of a valuable media cassette 131 and the valuable media cassette 131 is loaded into a valuable media storage bin 130 associated with a valuable media depository 100 of an SST.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A valuable media cassette, comprising:
a storage base to store valuable media;
a cover comprising:
- a first inside portion comprising a first blast energy collection plate with a plurality of first apertures surrounded by a first set of serrated teeth that surround and line edges of each first aperture;
- a second inside portion comprising a second blast energy collection plate with a plurality of second apertures surrounded and lined around edges of the second apertures by a second set of serrated teeth that surround each second aperture;
- a first set of spacers adapted to adjust and hold two ends of a first fluid filled bag and pinch the first fluid filled bag holding the first fluid filled bag in place and removing slack in the first fluid filled bag forcing a first fluid in the first fluid filled bag upward into a top surface of the first fluid filled bag to extend first portions of the first fluid filled bag through the first apertures, wherein the first set of spacers are adjustable and moveable; and
- a second set of spacers adapted to adjust and hold two ends of the second fluid filled bag and pinch the second fluid filled bag holding the second fluid filled bag in place and removing slack in the second fluid filled bag forcing a second fluid in the second fluid filled bag upward into a top surface of the second fluid filled bag to extend second portions of the second fluid filled bag through the second apertures, wherein the second set of spaces are adjustable and moveable;
- wherein the first blast energy collection plate is adapted to encase and to hold the first fluid filled bag with the first portions extending through the first apertures of the first blast energy collection plate and in direct contact with the first set of serrated teeth, wherein the first apertures are first dispersion windows;
- wherein the second blast energy collection plate is adapted to encase and to hold the second fluid filled bag with the second portions extending through the second apertures of the second blast energy collection plate and in direct contact with the set of serrated teeth, wherein the second apertures are second dispersion windows;
- wherein the first set of serrated teeth is adapted to displace and puncture the first bag portions at a plurality of locations along the first bag causing the first fluid to be dispersed through the first dispersion windows and the second set of serrated teeth is adapted to displace and puncture the second bag portions at a second plurality of locations along the second bag causing the second fluid to be dispersed through the second dispersion windows when the cover is in a closed position and after encountering a sufficient force to cause the first fluid filled bag and the second fluid filled bag to rupture and disperse the first and second fluids onto the valuable media through the first dispersion windows and the second dispersion windows of the cover onto the valuable media.

2. The valuable media cassette of claim 1, wherein the cover further comprises:
- a first guide situated over the first blast energy collection plate, the first guide comprising a plurality of the first dispersion windows through which the first portions of the first fluid filled bag partially extend through; and
- a second guide situated over the first blast energy collection plate, the second guide comprising a plurality of the second dispersion windows through which the second portions of the second fluid filled bag partially extend through.

3. The valuable media cassette of claim 2, wherein the first blast energy collection plate and the second blast energy collection plate are constructed of a sheet metal material.

4. The valuable media cassette of claim 3, wherein the first set of serrated teeth and the second set of serrated teeth comprise serrated edges notched in the sheet metal material.

5. The valuable media cassette of claim 4, wherein the first guide and the second guide are constructed of a plastic material.

6. The valuable media cassette of claim 5, wherein the first set of spaces and the second set of spaces are constructed of the plastic material.

7. The valuable media cassette of claim 1, wherein the first blast energy collection plate is removable to replace the first fluid filled bag when the cover is in an open position, and wherein the second blast energy collection plate is removable to replace the second fluid filled bag when the cover is in the open position.

8. The valuable media cassette of claim 1, wherein the first blast energy collection plate and the second blast energy collection plate are adapted to hold the first fluid filled bag and the second fluid filled bag above the valuable media of the storage base when the cover is in the closed position.

9. The valuable media cassette of claim 1, wherein the first blast energy collection plate and the second blast energy collection plate is adapted to absorb a portion of energy associated with the sufficient force and release the portion of energy by displacing the first set of serrated teeth and the second set of serrated teeth.

10. A system, comprising:
a Self-Service Terminal (SST);
a depository integrated into the SST as a peripheral device, the depository comprising a valuable media storage bin;
a valuable media cassette adapted to store valuable media and be inserted and removed from the valuable media storage bin; and
the valuable media cassette comprising:
- at least one blast energy collection plate adapted to hold an indelible ink bag above the valuable media and against serrated teeth when the valuable media cassette is loaded into the storage bin with the valuable media;
- the at least one blast energy collection plate further adapted to absorb a portion of energy associated with a force experienced by the at least one blast energy collection plate and release the portion of energy by displacing the serrated teeth; and
- two sets of spacers, each set adapted to adjust and hold two ends of a corresponding indelible ink bag and pinch the corresponding indelible ink bag holding the corresponding indelible ink bag in place and removing slack in the corresponding indelible ink bag forcing an indelible ink in the corresponding indelible ink bag upward into a top surface of the corresponding indelible ink bag to extend first portions of the corresponding indelible ink bag through apertures, wherein each set of spacers are adjustable and moveable;
- wherein the serrated teeth are adapted to puncture the corresponding indelible ink bag to cause the corresponding indelible ink to disperse over the valuable media when the force is applied to the SST, the depository, or the valuable media cassette resulting in the valuable media being ink stained and damaged for use, wherein the serrated teeth surround the corresponding indelible ink bag on two sides around the corresponding apertures that the corresponding indelible ink bag extends through when held by the at least one blast energy collection plate, the corresponding apertures are dispersion windows, each corresponding dispersion window surrounded and lined around edges of the corresponding dispersion window by the corresponding serrated teeth, wherein the indelible ink is released from the corresponding indelible ink bag through the corresponding dispersion window when the serrated teeth is displaced and punctures the corresponding indelible ink bag at a plurality of locations along the two sides on the corresponding indelible ink bag.

11. The system of claim 10, wherein the at least one blast energy collection plate comprises two blast energy collection plates.

12. The system of claim 11, wherein the two blast energy collection plates comprise a first blast energy collection plate that is situated along a first inside edge of a cover for the valuable media cassette and a second blast energy collection plate that is situated along an opposing inside edge of the cover.

13. The system of claim 10, wherein the at least one blast energy collection plate is situated on an inside of a cover for the valuable media cassette.

14. The system of claim 13, wherein the inside of the cover comprises at least one plastic guide that encases the at least one blast energy collection plate.

15. The system of claim 10, wherein the at least one blast energy collection plate comprises the corresponding apertures a perimeter of the corresponding apertures comprise the serrated teeth, and wherein the at least one blast energy collection plate further adapted to hold the corresponding indelible ink bag with the corresponding first portions of the corresponding indelible ink bag at least partially extending through the corresponding apertures against the serrated teeth.

16. The system of claim 10, wherein the SST is an Automated Teller Machine (ATM).

* * * * *